US005907611A

United States Patent [19]
Dezonno et al.

[11] Patent Number: 5,907,611
[45] Date of Patent: *May 25, 1999

[54] APPARATUS AND METHOD FOR IDENTIFYING RECORDS OF OVERFLOWED ACD CALLS

[75] Inventors: Anthony J. Dezonno, Chicago; Roger A. Sumner, Batavia; David L. Blaha, Aurora, all of Ill.

[73] Assignee: Rockwell International Corp., Seal Beach, Calif.

[ * ] Notice: This patent is subject to a terminal disclaimer.

[21] Appl. No.: 08/843,021

[22] Filed: Apr. 11, 1997

[51] Int. Cl.$^6$ ................................................. H04Q 3/64
[52] U.S. Cl. ........................ 379/266; 379/265; 379/309
[58] Field of Search .................................... 379/265, 266, 379/309, 219, 220, 221, 242, 243, 113, 112, 111, 114, 115

[56] References Cited

U.S. PATENT DOCUMENTS

| | | | |
|---|---|---|---|
| 4,400,587 | 8/1983 | Taylor et al. | 379/266 |
| 4,737,983 | 4/1988 | Frauenthal et al. | 379/221 |
| 5,384,841 | 1/1995 | Adams et al. | 379/266 |
| 5,469,504 | 11/1995 | Blaha | 379/265 |
| 5,500,891 | 3/1996 | Harrington et al. | 379/265 |
| 5,526,416 | 6/1996 | Dezonno et al. | 379/266 |
| 5,544,232 | 8/1996 | Baker et al. | 379/88.25 |
| 5,724,419 | 3/1998 | Harbuziuk et al. | 379/265 |
| 5,740,238 | 4/1998 | Flockhart et al. | 379/266 |
| 5,740,240 | 4/1998 | Jolissaint | 379/266 |
| 5,754,639 | 5/1998 | Flockhart et al. | 379/266 |

*Primary Examiner*—Scott Wolinsky
*Attorney, Agent, or Firm*—Welsh & Katz, Ltd.

[57] ABSTRACT

An apparatus and method are provided for identifying a call record of a telephone call received from a PSTN and overflowed from a source automatic call distributor to a destination automatic call distributor, the call record having been stored under a call identifier of the source automatic call distributor in a memory of a host computer serving both the source automatic call distributor and the destination automatic call distributor. The method includes the step of storing a call action provided message in a call overflow table of the host computer including a call identifier assigned by the source automatic call distributor and an identifier of the source automatic call distributor. An overflow request is transferred over an ISDN facility to the destination automatic call distributor including the call identifier. The overflow table is searched using the call identifier transferred to the destination automatic call distributor to locate the identifier of the source automatic call distributor and the call record is identified using the call identifier and located identifier of the source automatic call identifier.

43 Claims, 3 Drawing Sheets

APPARATUS AND METHOD FOR IDENTIFYING RECORDS OF OVERFLOWED ACD CALLS

FIELD OF THE INVENTION

The field of the invention relates to automatic call distribution systems and in particular to tracking of calls overflowed from one automatic call distributor to another automatic call distributor.

BACKGROUND OF THE INVENTION

Automatic call distribution systems are known. Such systems are typically used as a means of distributing telephone calls among a group of agents of an organization. While the automatic call distributor (ACD) may be a separate part of a private branch telephone exchange (PBX), often the ACD is integrated into and is an indistinguishable part of the PBX.

Often the organization disseminates a single telephone number to its customers and to the public in general as a means of contacting the organization. As calls are directed to the organization from the public switched telephone network (PSTN), the automatic call distribution system directs the calls to its agents based upon some algorithm, typically based upon availability. For example, where all agents are considered equal, the ACD may distribute the calls based upon which agent position (telephone) has been idle the longest time.

In order to distribute incoming calls from the PSTN to the available agents, the interaction of a controlling computer with a switching fabric of the PBX and ACD becomes essential. Often a connection to a local PSTN is in the form of a number of trunk connections. Each of the trunk connections is monitored by the controller for incoming calls. Where a call is detected, the controller searches for and selects an idle agent. Upon selecting an agent, the controller commands the switch to form a connection between the incoming trunk and selected agent.

In more complicated systems, the organization may use a number of telephone numbers to identify different individuals and functions within the organization. Each telephone number may be assigned to a particular incoming trunk or group of incoming trunk lines. As such, the controller may be required to recognize a call target based upon an identity of an incoming trunk line and route the call accordingly.

In other systems, the ACD of an organization may receive calls directed to different call targets over the same trunk lines. In such a case, the call target may be identified to the ACD by a pulse code modulated (PCM) signal transferred from the PSTN to the controller of the ACD by a dialed number identification service (DNIS) operating from within the PSTN.

In systems associated with service organizations, where many calls are received and handled by many agents, it may be important for an agent to have ready access to customer files. In such a situation, a database is maintained of existing customers. Customer records may be displayed on agent terminals as the agents converse with specific customers. In some cases, the customer may be identified to the database for display of records on the terminal by the agent entering a customer identifier into a keyboard associated with the terminal. Alternatively, the controller of the ACD may transfer an identifier of the customer to the database based upon an automatic number identification (ANI) facility, operating from within the PSTN.

Where ANI is used, the controller of the ACD receives the ANI digits (identifying the caller via the caller's telephone number) at the same time the call arrives from the PSTN. Upon selecting an agent, the controller may transfer the call to a queue for the selected agent or directly to the selected agent. At the same time that the call is delivered to the agent, the controller sends an identifier of the selected agent and ANI number of the customer to a controller of the database (the host). The host, in turn, displays the customer records via a computer monitor of the selected agent at the same time the call is delivered.

As a further feature, calls may be transferred among agents. Where a first agent finds that he or she cannot help a particular customer, the agent may activate a key on a keyboard of the agent and enter an identity of another agent or agent group that may be better able to help the customer. The controller of the ACD may immediately connect the call to the newly identified agent, or may place the call in a queue until the identified agent becomes available.

In either case, the controller transfers a message to the host identifying the previous and newly identified agent. Since the host knows the identity of the customer displayed at the terminal of the previous agent, the host may now display those same customer records at the terminal of the newly selected agent.

Where a call is placed in a queue, the ACD controller may monitor a total time that the call has been in the queue. Where the time exceeds a threshold value, the controller may transfer (overflow) the call to a newly selected agent at another less heavily loaded ACD (overflow ACD) within the same organization. The controller of the transferring ACD transfers DNIS and ANI information as well as a call sequence number assigned by the transferring ACD to the overflow ACD. The overflow ACD, upon receiving the call, transfers the information to the host including an identifier that the call is an overflow call. The host in turn then polls each ACD to identify the transferring ACD and any recently created call records generated by the transferring ACD.

While the existing method of ACD operation is relatively satisfactory, it is dependent upon a record of connection transactions as a method of identifying a call to the host. Where a connection to an agent is completed, a transaction identifier is sent to the host memorializing the transaction. The record of the connection is placed in a call record held in an area reserved for the transferring ACD. Where a call is received and placed in a queue for delivery to the next available agent, a call arrival message is sent to the host and saved in the transferring ACD's record area. Where the call is then transferred to another ACD, there is no means for directly identifying the call record created by the transferring ACD. As a consequence, the host must poll (i.e., search the call records of) each ACD to identify the call record of the call. Where a host serves many ACDs, a considerable amount of time may be lost searching for call records. Accordingly, a need exists for a better method of tracking overflow calls among ACDs.

SUMMARY

An apparatus and method are provided for identifying a call record of a telephone call received from a PSTN and overflowed from a source automatic call distributor to a destination automatic call distributor, the call record having been stored under a call identifier of the source automatic call distributor in a memory of a host computer serving both the source automatic call distributor and the destination automatic call distributor. The method includes the step of storing a call action provided message in a call overflow table of the host computer including a call identifier assigned by the source automatic call distributor and an identifier of the source automatic call distributor. An overflow request is transferred over an ISDN facility PSTN to the destination automatic call distributor including the call identifier. The overflow table is searched using the call identifier transferred to the destination automatic call distributor to locate the identifier of the source automatic call distributor and the call record is identified using the call identifier and located identifier of the source automatic call identifier.

DETAILED DESCRIPTION OF A PREFERRED EMBODIMENT

Figure 1:
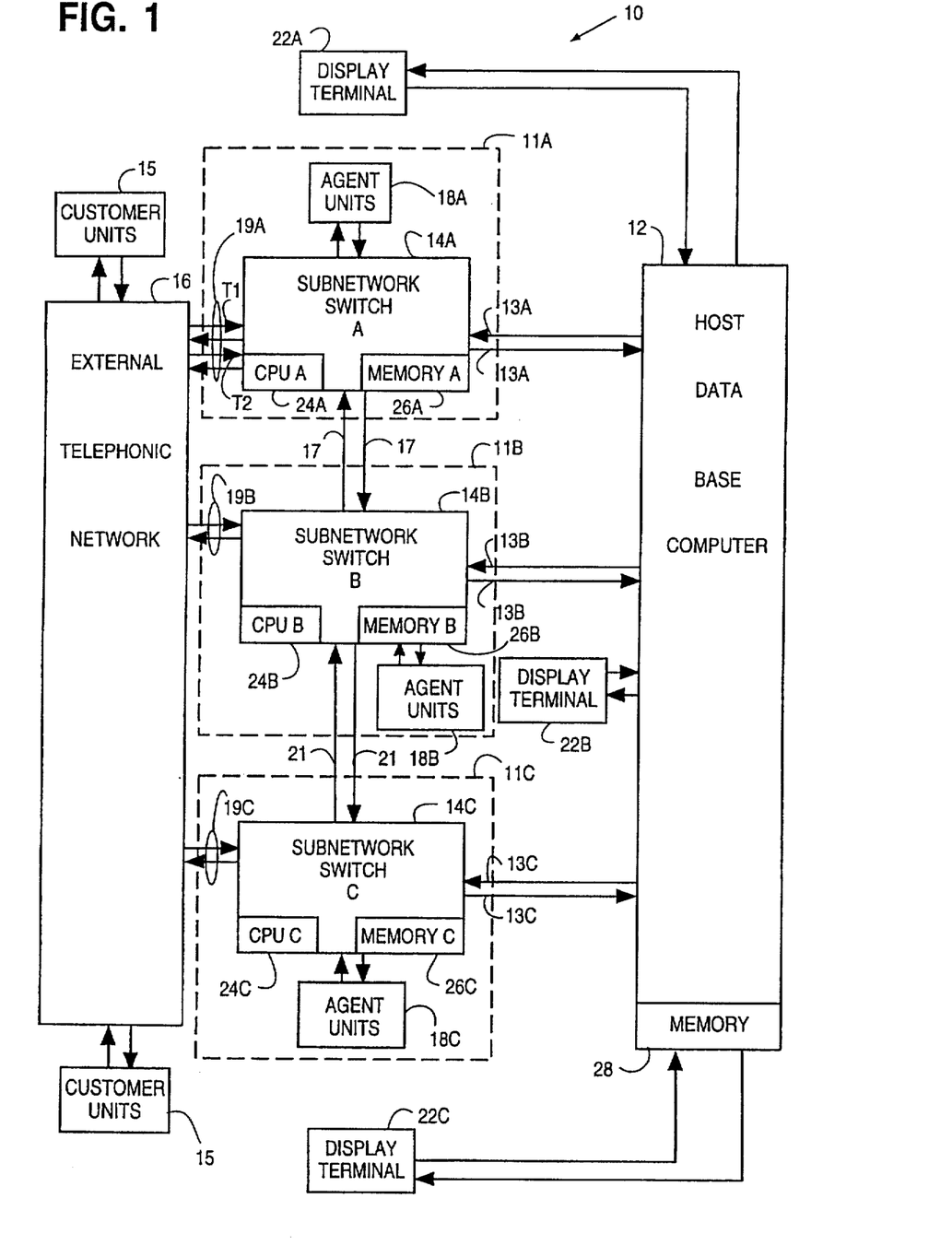
FIG. 1 depicts an automatic call distribution system in accordance with an embodiment of the invention.

FIG. 1 is a block diagram of an automatic call distribution (ACD) system 10 in accordance with an embodiment of the invention. ACDs similar to the type shown in FIG. 1 may be available from any of a number of manufacturers (e.g., the Galaxy system made by Rockwell International Corporation of Seal Beach, Calif.).

Figure 2:
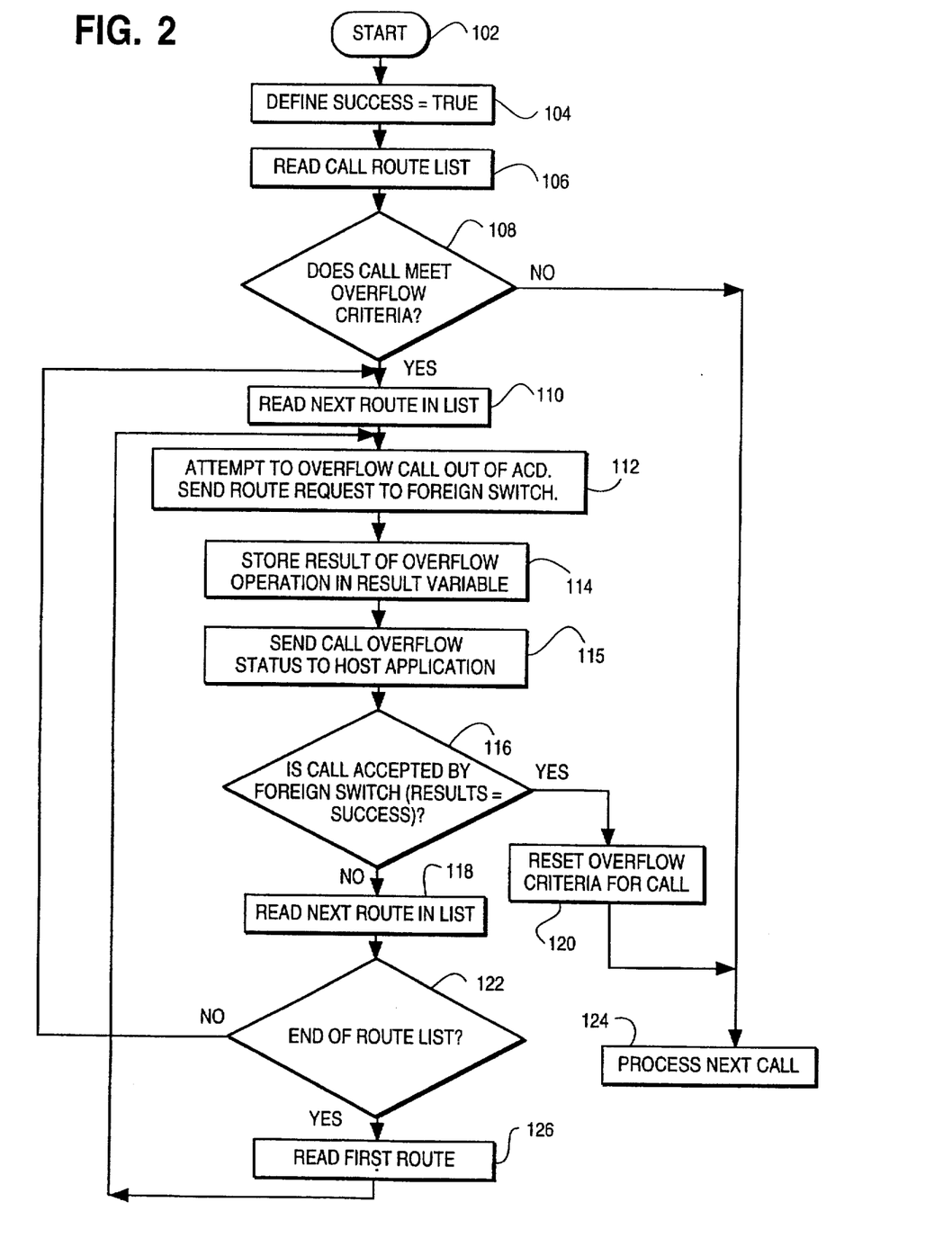
FIG. 2 is a flow chart depicting the process of the system of FIG. 1.

FIG. 2 is a flow chart of activity of the system 10 under the embodiment. Reference shall be made to FIGS. 1 and 2 as appropriate to an understanding of the invention.

Under the embodiment, a first, second and third internal ACD networks 11A, 11B, 11C are connected to a host database computer 12 and the PSTN 16. Internal networks 11A, 11B, 11C may be located at geographically diverse locations and may be interconnected one-to-another by an appropriate interconnecting group of private ISDN lines 17, 21 (e.g., leased lines, virtual private lines, microwave links, etc.). Similarly, the internal networks 11A, 11B, 11C may be interconnected with the host 12 through an appropriate data link 13A, 13B, 13C (e.g., leased lines, virtual private lines, microwave link, the Internet, digital packet switching, etc.).

While the individual ACD networks 11B, 11B, 11C are shown interconnected directly with the host 12, it is understood that a CallPath SwitchServer/2 (not shown) available from Rockwell International and IBM may be required for the interconnection of the networks 11A, 11B, 11C with the host 12.

A SwitchServer/2 may be provided by an IBM compatible ISA PC with a Pentium 120 MHZ processor or higher having 16 Mbyte RAM, 125 Mbyte fixed disk and an IBM X.25 Interface Co-Processor/2. An IBM X.25 Interface Co-Processor/2 Cable Option V.24 may be used as an interface with the networks 11A, 11B, 11C. Ethernet or Token Ring Interface cards may be necessary depending upon the configuration of the ACD system 10.

Software for the SwitchServer/2 may be provided using the IBM Operating System/2 (OS/2) Version 3.1 with Communications Manager/2 Version 1.1 or later. An IBM Local Area Protocol Support (LAPS) may be used for support and control of the LAN interface.

The internal networks 11A, 11B, 11C may be connected to the PSTN 16 through a number of trunk lines 19A, 19B, 19C. The PSTN 16 may offer telephone service to the system 10 on trunk lines 19A, 19B, 19C in conjunction with a number of call-delivery features such as ANI and DNIS.

DNIS information supplied by the PSTN 16 is useful for the internal networks 11A, 11B, 11C where inbound calls to the internal networks 11A, 11B, 11C may be directed to any of a block of telephone numbers assigned to each of the internal networks 11A, 11B, 11C. This may be useful where the block of numbers to the internal network (e.g., 11A) is connected through the trunk lines 19A in rotary fashion, so that when the calling party from the PSTN appears, for example, on trunk T1, it can be determined whether the calling party was, in fact, calling the telephone number corresponding to trunk T1 or was, in fact, calling the telephone number corresponding to trunk T2 and was rotated down to the next available trunk, T1.

With regard to inbound calls, the switches 14A, 14B, 14C function to selectively interconnect calls from external customer units 15 of the external PSTN 16 to agents 18A, 18B, 18C of the internal networks 11A, 11B, 11C. As such, each switch 14A, 14B, 14C functions as an automatic call distributor within its own internal network 11A, 11B, 11C.

The switches 14A, 14B, 14C are controlled by central processing units, or CPUs, 24A, 24B, 24C, in conjunction with peripheral memory devices 26A, 26B, 26C. Control of the switches 14A, 14B, 14C and communications with the host 12 and PSTN 16 may be accomplished generally as described in U.S. Pat. No. 5,268,903, and U.S. Pat. No. 5,140,611, both to Jones et. al., and both incorporated herein by reference. Routing of calls to agents 18A, 18B, 18C and overflow of calls may be accomplished generally as described in: U.S. Pat. No. 5,335,269 to Steinlicht; U.S. Pat. No. 5,365,581 to Baker et al.; and U.S. Pat. No. 5,384,841 to Adams et al., all incorporated herein by reference.

During operation, the CPUs 24A, 24B, 24C monitor each port of the switch 14A, 14B, 14C for changes in status. A change in status may be an agent unit 18A, 18B, 18C going off-hook to make a call, an agent unit 18A, 18B, 18C hanging up after a call 118, or it may be a call alerting tone detected on a trunk 19A, 19B, 19C alerting the CPU 24A, 24B, 24C to the presence of an incoming call.

Where the status change is an agent 18A, 18B, 18C hanging up 118, the CPU 24A, 24B, 24C acts to tear-down the call connection within the switch 14A, 14B, 14C between the agent at a first port of the switch and a second party to the conversation communicating through a second port of the switch 14A, 14B, 14C. Upon tear down of the connection, the CPU 24A, 24B, 24C also sends a message to the host, notifying the host of termination of the call connection. The message to the host 12 would include at least the identity of the agent 18A, 18B, 18C.

Where the status change is an agent 18A, 18B, 18C going off-hook, the CPU 24A, 24B, 24C interprets such change as preparation for the placement of a telephone call. As such, the CPU 24A, 24B, 24C prepares to receive a set of dialed digits. Upon receiving the digits and if the digits are determined as being a call directed to an outside party, then the CPU 24A, 24B, 24C may seize an outgoing trunk line 19A, 19B, 19C and send a call alert followed by the dialed digits. Where the alert is answered by a call connection acknowledgment, the CPU 24A, 24B, 24C completes the connection between the port of the agent (e.g., 18A, 18B, 18C) and the port of the seized trunk line.

If the call is directed to another agent 18A, 18B, 18C or some other party within the organization, then the CPU 24A, 24B, 24C may identify the port to which the calling party is to be connected by reference to a look-up table within memory 26A, 26B, 26C. Upon locating the party, the CPU 24A, 24B, 24C may then cause a connection to be set-up between appropriate ports within the switch 14A, 14B, 14C between the calling and called party.

Where the status change is a call alert signal on an incoming trunk line (or a control channel associated with an incoming trunk line), then the CPU 24A, 24B, 24C may send an acknowledge message to the PSTN 16 accepting the call. The PSTN 16 may respond with the forwarding of DNIS and ANI messages, identifying the called and calling party.

Upon accepting the call, the CPU 24A, 24B, 24C first stores the DNIS and ANI numbers in a termination table of the memory 26A, 26B, 26C. More specifically, the CPU 24A, 24B, 24C maintains a table of call information for each port of the switch 14A, 14B, 14C. Where a call is accepted on an incoming trunk line, the CPU 24A, 24B, 24C enters the DNIS and ANI number into the table for the incoming trunk line upon which the call is received.

Figure 3:
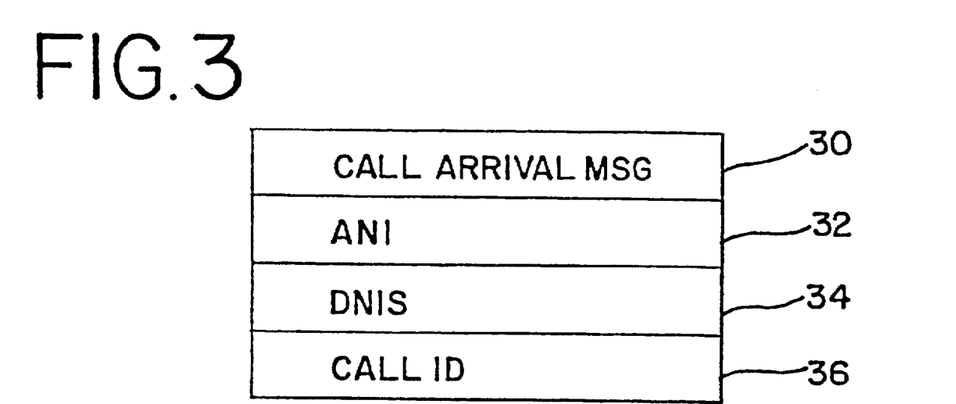
FIG. 3 depicts a call arrival message used by the system of FIG. 1.

In addition to updating the termination table within memory 26A, 26B, 26C, the CPU 24A, 24B, 24C also generates a call identifier (also sometimes referred to as a call ID or sequence number) for the call, unique to the switch 14A, 14B, 14C. The call identifier 36 along with the ANI 32 and DNIS 34 numbers (FIG. 3) may then be sent to the host 12 as part of a call arrival message 30. Delivery of the ANI and DNIS numbers and call identifier allows the host 12 to create a unique call record for the call in memory 28, in a call record area of memory 28 reserved for the switch 14A. The call record may be used to retrieve customer records for delivery to an appropriate display terminal 22A, 22B, 22C once the call has been assigned to an agent 18A, 18B, 18C.

The CPU 24A, 24B, 24C then, by reference to the DNIS number, determines the identity of agent 18A, 18B, 18C to which the call is to be directed. For example, the DNIS number may be used to differentiate between calls directed to a first telephone number arriving on a first incoming trunk group directed to a sales group of the organization from calls directed to a service group of the organization. Since agents servicing sales calls would, in most cases, not handle calls directed to service, the DNIS number provides a convenient means of differentiating between two or more types of calls.

Upon determining the identity of the agent 18A, 18B, 18C (or group of agents) the CPU 24A, 24B, 24C instructs the switch 14A, 14B, 14C to internally connect the port of the incoming trunk to the port of the identified agents.

Where the call has been connected to an agent, the CPU 24A, 24B, 24C stores the port number of the identified agent in the termination table for the port of the incoming trunk. Likewise, the CPU 24A, 24B, 24C stores the port identifier of the incoming trunk in the termination table of the identified agent.

To complete set-up of the call to the identified agent, the CPU 24A, 24B, 24C sends a call completion message to the host 12. The call completion message includes at least a port identifier of the identified agent and the call identifier. The call identifier allows the host 12 to reference the original call record created by the host 12 upon receipt of the call arrival message. Since the call arrival record has a customer identifier (i.e., the ANI number), the port identifier allows the host 12 to deliver customer data to the specific display terminal 22A, 22B, 22C of the agent to which the call was delivered.

In the alternative, if all of the agents (e.g., 18A) were busy, then an incoming call (e.g., received on incoming trunk T1 of the first switch 14A) would be placed in a queue. While in the queue, the CPU 24A compares 108 certain parameters of each call in the queue (e.g., time in the queue) with a set of overflow threshold values. Where the parameters of the queued call exceed one or more of the overflow threshold values, the call may be considered a candidate for overflow to another switch.

In preparation for overflowing the call 102, 104, 106, the CPU 24A sends 114, 115 a call action provided (CAP) message 38 (FIG. 4) to the host 12. The CAP message 38 is stored in a call overflow table in memory 28 for later reference in identifying the original call record created by the first switch 14A.

In further preparation for overflow, the CPU 24A retrieves 110 an identity of the next overflow destination (e.g., switch 14B) from a stack within the CPU 24A and prepares to transfer 112 an overflow request to the second switch 14B, under an ISDN format through the interconnect 17. The overflow request transferred to the second switch 14B through a "D" channel of the ISDN interconnect may include DNIS and ANI information, an identifier of the originating ACD, a call priority level and the time the call was in a queue at the originating ACD. A header of the ISDN message identifies the destination ACD 14B to the telephone system 16 and ensures that the message is properly routed to the destination switch 14B.

Upon receiving and decoding the overflow request, the destination switch 14B may either accept the call 116, 120, 124, or reject the call 116, 118, 122. The switch 14B may accept the call if the length of its queue of other callers does not exceed some threshold value or other programmable value.

If the switch 14B accepts the call, then the switch returns a call accept message through the ISDN interconnect. Upon receiving the call accept message, the CPU 24A of the switch 14A instructs the switch 14A to form a connection between the incoming trunk port T1 and the interconnect port 17 for purposes of transferring the call.

If the destination switch 14B did not accept the call, then the CPU 24A may retrieve 118, 122, 126 the next potential overflow destination from the internal stack of the CPU 24A. The next overflow destination may be switch 14C. To execute the overflow, the CPU 24A may again seize an ISDN "D" channel and transfer an overflow request 112.

Upon receipt of the request by the third switch 14C, the CPU 24C may determine that it can accept the transfer and returns a transfer accepted message through the ISDN interconnect. Upon receiving the transfer accepted message, the CPU 24A of the first switch 14A instructs the switch 14A to form an internal connection between the port of the incoming trunk T1 and seized channel of the outgoing interconnect 17.

The CPU 24A may also takes steps to set up the call by transferring a call connection request (i.e., switching instructions) to the second switch 14B over the seized interconnect 17 (or a control channel of the seized interconnect) using PCM (or some other appropriate communication protocol) requesting that the second switch 14B provide a connection to the third switch 14C. Once the connection is made with the third switch 14C, the first switch 14A may also transfer the call sequence number (used by the first switch 14A) to the third switch 14C as a means by which the third switch 14C may match the transferred call with the information previously forwarded via the transfer request.

Upon matching the call with the transfer request, the CPU 24C of the third switch 14C knows the agent group requested by the caller based upon the DNIS number contained within the call request. As a consequence, the third CPU 24C may place the call in a queue and, at an appropriate instant, connect the call to a selected agent 18C.

Further, the CPU 24C may also transfer the ANI digits of the caller to the host 12 for purposes of identifying customer records. The host 12, however, does not know if it was the second switch 14B that originated the transfer, or the first switch 14A. Further, since an identifier of the source ACD 14A is not available to the host 12, the host cannot yet identify the call record of the call created by the first switch 14A.

The prior art has taught that for a host 12 to identify the source of the call transfer, a polling operation must be performed on the other switches. The polling may be performed by transferring a request to the host 12 requesting that each switch of the system 10 be polled to find out the identity of the switch 14A, 14B which directed a call transfer to the destination switch 14C at that instant the destination switch 14C received the transfer request. The polling operation may be carried out by the host 12 sequentially searching the call records of each ACD 14A, 14B, 14C.

Under the embodiment, the polling of switches 14A, 14B, 14C is avoided through the transfer 115 of a call action provided (CAP) message 38 (FIG. 4), reserved for use in identifying transferred calls arriving at an overflow destination. The CAP message may be transferred to the host 12 before the transfer of a call. The CAP message is stored in an overflow table within a memory 28 of the host 12, in an area not associated with any particular switch 14A, 14B, 14C.

Figure 4:
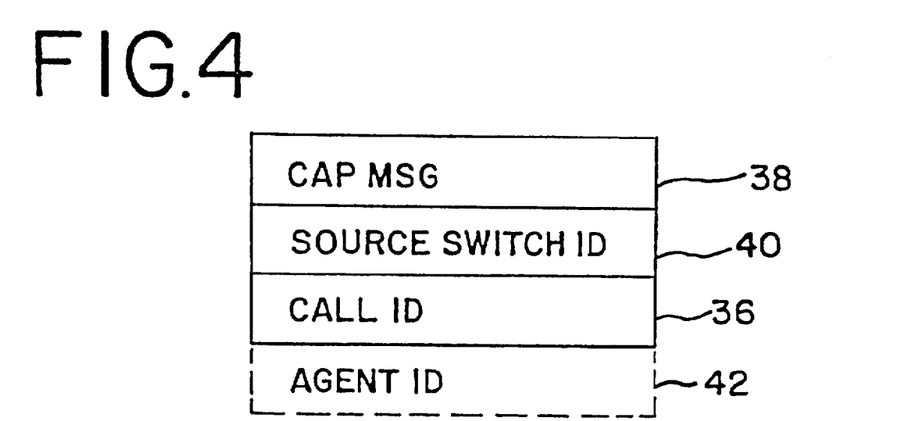
FIG. 4 depicts a call action provided message of the system of FIG. 1.

In the example given above of a call transferred from an incoming trunk T1, the CAP message to the host 12 includes at least two fields. The first field is an identifier 40 of the sending switch 14A. The second field is the call identifier 36 assigned by the source switch 14A. A third optional field 42 is provided for identification of an agent 18A, in the case where the call had been answer by an agent 18A and subsequently transferred.

When the destination switch 14C receives the call, the destination switch 14C assigns a new call identifier (new call ID) to the call. The destination switch 14C also sends a call arrival message 30 (FIG. 5) to the host 12. In this case, however, the destination switch 14C does not have a sufficient number of data fields in the call arrival message 30 to send both the source switch ID and call ID of the source ACD 14A. Instead, the destination switch 14C sends an indication 44 that the call is an overflow call, the call identifier 36 of the source switch 14A along with the new call ID 46 of the destination switch.

Figure 5:
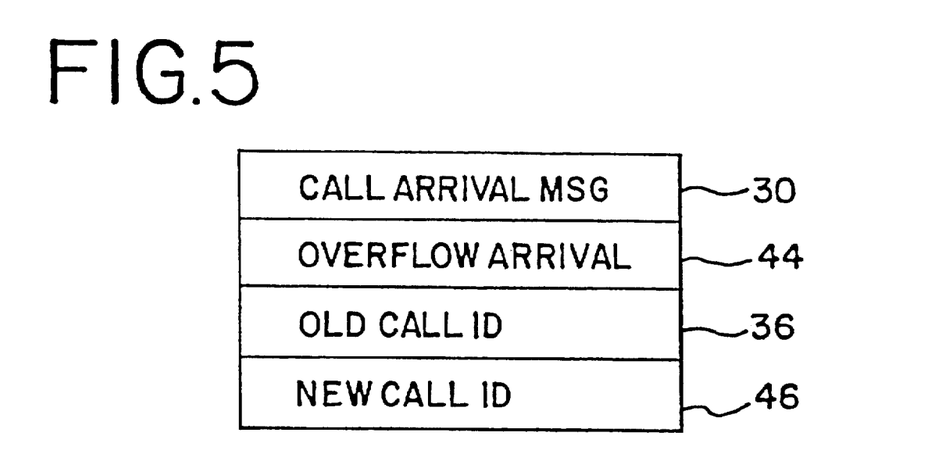
FIG. 5 depicts an overflow arrival message of the system of FIG. 1.

Upon receiving the call arrival message 30 from the destination switch 14C, the host 12 searches an overflow table in memory 28 of the host 12 for the call identifier 36 assigned by the source switch 14A. Upon entering the overflow table using the old call ID 36, the host 12 is able to retrieve an identifier of the source ACD 14A. Upon identifying the source ACD 14A, the host 12, in turn, is able to access the call records of the source ACD 14A for purposes of identifying the call record of the overflowed call. Upon identifying the call record, the host 12 is able to retrieve the call record (FIG. 3) and the ANI 32 of the customer.

Upon retrieving the call file, the host 12 is able to transfer the call record to the memory area reserved for the destination switch 14C. When the call is delivered to a selected agent 18C, the call record may now be used by the host 12 to simultaneously deliver customer records to the terminal display 22C of the selected agent 18C.

The use of the CAP message improves the efficiency of overflow operation by allowing the host 12 to directly identify call records without the processor intensive process of searching call files of each switch. The use of the CAP message from the transferring ACD also provides the host 12 with a means for identifying overflow calls on an exception basis rather than requiring a modification of the structure of the call arrival message, at least one of which must be transmitted to the host with the arrival of each call.

In another embodiment of the invention, the host 12 stores call records under an identifier of agent position 18A, 18B, 18C. In the event of an overflow, the source automatic call distributor 14A, 14B, 14C transfers a CAP message to the host including a previous position identifier of an agent 18A, 18B, 18C which handled the call and an identifier of the source switch 14A, 14B, 14C. When the source ACD 14A, 14B, 14C transfers an overflow request, the source ACD 14A, 14B, 14C transfers the previous position identifier, instead of the call identifier of previous examples. The destination ACD 14A, 14B, 14C transfers the previous position identifier to the host 12. The host 12 uses the previous position identifier to identify the source ACD 14A, 14B, 14C in the overflow table. The host 12 then locates the call record using both source ACD identifier and previous position identifier.

A specific embodiment of a method and apparatus of overflowing calls according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

We claim:

1. A method of identifying a call record of a telephone call received from a public switched telephone network (PSTN) and overflowed from a source automatic call distributor to a destination automatic call distributor, the call record having been stored under a call identifier of the source automatic call distributor in a memory of a host computer serving both the source automatic call distributor and the destination automatic call distributor, such method comprising the steps of:

storing a call action provided message in a call overflow table of the host computer including a call identifier assigned by the source automatic call distributor and an identifier of the source automatic call distributor;

transferring an overflow request over an integrated services digital network (ISDN) facility to the destination automatic call distributor including the call identifier;

searching the overflow table using the call identifier transferred to the destination automatic call distributor to locate the identifier of the source automatic call distributor; and locating the call record using the call identifier and located identifier of the source automatic call distributor.

2. The method as in claim 1 further comprising the step of transferring an overflow accept response from the destination automatic call distributor to the source automatic call distributor over the ISDN facility of the PSTN.

3. The method as in claim 1 further comprising the step of overflowing the call over a private line between the source and destination automatic call distributors.

4. The method as in claim 1 wherein the step of locating the call record using the call identifier and located identifier of the source automatic call distributor further comprises the step of searching an area of the memory reserved for the source automatic call distributor for the call record stored under the call identifier of the source automatic call distributor.

5. The method as in claim 4 further comprising the step of storing an output of an automatic number identification service as call associated data received from the PSTN.

6. The method as in claim 5 further comprising the step of selecting a call queue from a plurality of call queues based upon the output of the automatic number identification service.

7. The method as in claim 1 further comprising the steps of receiving the telephone call from the PSTN at the source automatic call distributor, assigning the call identifier to the call and placing the call in a call queue.

8. The method as in claim 7 wherein the step of placing the call in a call queue further comprises the step of selecting the call queue from a plurality of call queues.

9. The method as in claim 7 further comprising the step of receiving call associated data from the PSTN and storing the call associated data in a termination table of the source automatic call distributor.

10. The method as in claim 9 further comprising the step of transferring a call arrival message to the host computer including the call associated data received from the PSTN.

11. The method as in claim 10 further comprising the step of creating the call record in an area of the memory reserved for the source automatic call distributor, the call record including at least the call associated data of the call arrival message.

12. The method as in claim 9 wherein the step of receiving call associated data from the PSTN and storing the call associated data in a termination table of the source automatic call distributor further comprises the step of storing an output of an automatic number identification service as call associated data received from the PSTN.

13. The method as in claim 9 further comprising the step of storing an output of a dialed number identification service as call associated data received from the PSTN.

14. The method as in claim 13 further comprising the step of selecting a call queue from a plurality of call queues based upon the output of the dialed number identification service.

15. The method as in claim 1 further comprising the step of measuring a set of call parameters and determining that the call has met a call overflow criteria.

16. Apparatus for identifying a call record of a telephone call received from a public switched telephone network (PSTN) and overflowed from a source automatic call distributor to a destination automatic call distributor, the call record having been stored under a call identifier of the source automatic call distributor in a memory of a host computer serving both the source automatic call distributor and the destination automatic call distributor, such apparatus comprising:

means for storing a call action provided message in a call overflow table of the host computer including a call identifier assigned by the source automatic call distributor and an identifier of the source automatic call distributor;

means for transferring an overflow request over an integrated services digital network (ISDN) facility to the destination automatic call distributor including the call identifier;

means for searching the overflow table using the call identifier transferred to the destination automatic call distributor to locate the identifier of the source automatic call distributor; and means for locating the call record using the call identifier and located identifier of the source automatic call distributor.

17. The apparatus as in claim 16 wherein the means for locating the call record using the call identifier and located identifier of the source automatic call distributor further comprises means for searching an area of the memory reserved for the source automatic call distributor for the call record stored under the call identifier of the source automatic call distributor.

18. The apparatus as in claim 17 further comprising means for storing an output of an automatic number identification service as call associated data received from the PSTN.

19. The apparatus as in claim 18 further comprising means for selecting a call queue from a plurality of call queues based upon the output of the a utormatic number identification service.

20. The apparatus as in claim 16 further comprising means for receiving the telephone call from the PSTN at the source automatic call distributor, means for assigning the call identifier to the call and means for placing the call in a call queue.

21. The apparatus as in claim 20 wherein the means for placing the call in a call queue further comprises means for selecting the call queue from a plurality of call queues.

22. The apparatus as in claim 20 further comprising means for receiving call associated data from the PSTN and storing the call associated data in a termination table of the source automatic call distributor.

23. The apparatus as in claim 22 further comprising means for transferring a call arrival message to the host computer including the call associated data received from the PSTN.

24. The apparatus as in claim 23 further comprising means for creating the call record in an area of the memory reserved for the source automatic call distributor, the call record including at least the call associated data of the call arrival message.

25. The apparatus as in claim 22 wherein the means for receiving call associated data from the PSTN and storing the call associated data in a termination table of the source automatic call distributor further comprises means for storing an output of an automatic number identification service as call associated data received from the PSTN.

26. The apparatus as in claim 22 further comprising means for storing an output of a dialed number identification service as call associated data received from the PSTN.

27. The apparatus as in claim 26 further comprising means for selecting a call queue from a plurality of call queues based upon the output of the dialed number identification service.

28. The apparatus as in claim 16 further comprising means for measuring a set of call parameters and determining that the call has met a call overflow criteria.

29. Apparatus for identifying a call record of a telephone call received from a public switched telephone network (PSTN) and overflowed from a source automatic call distributor to a destination automatic call distributor, the call record having been stored under a call identifier of the telephone call assigned by the source automatic call distributor in a memory of a host computer serving both the source automatic call distributor and the destination automatic call distributor, such apparatus comprising:

a first memory which stores a call action provided message in an overflow table of the host computer including the call identifier of the telephone call and an identifier of the source automatic call distributor;

a first communication processor configured to transfer an overflow request through an integrated services digital network (ISDN) facility to the destination automatic call distributor including the call identifier;

a search processor which searches the overflow table using the call identifier transferred to the destination automatic call distributor to locate the identifier of the source automatic call distributor; and a second search processor which locates the call record using the call identifier and located identifier of the source automatic call distributor.

30. The apparatus as in claim 29 wherein the second search processor which locates the call record using the call identifier and located identifier of the source automatic call distributor further comprises a directory containing a pointer address for searching an area of the memory reserved for the source automatic call distributor for the call record stored under the call identifier of the source automatic call distributor.

31. The apparatus as in claim 29 further comprising a second communication processor which receives the telephone call from the PSTN at the source automatic call distributor, assigns the call identifier to the call and places the call in a call queue.

32. The apparatus as in claim 31 wherein the second communication processor which places the call in a call queue further comprises a selector processor which selects the call queue from a plurality of call queues.

33. The apparatus as in claim 31 further comprising a first buffer which receives call associated data from the PSTN and stores the call associated data in a termination table of the source automatic call distributor.

34. The apparatus as in claim 33 further comprising a third communication processor which transfers a call arrival message to the host computer including the call associated data received from the PSTN.

35. The apparatus as in claim 34 further comprising a database processor which creates the call record in an area of the memory reserved for the source automatic call distributor, the call record including at least the call associated data of the call arrival message.

36. The apparatus as in claim 34 wherein the first buffer which receives call associated data from the PSTN and stores the call associated data in a termination table of the source automatic call distributor further comprises a fourth communication processor which stores an output of an automatic number identification service as call associated data received from the PSTN.

37. The apparatus as in claim 36 further comprising a first comparator which selects a call queue from a plurality of call queues based upon the output of the automatic number identification service.

38. The apparatus as in claim 37 further comprising a fifth communication processor which stores an output of a dialed number identification service as call associated data received from the PSTN.

39. The apparatus as in claim 38 further comprising a second comparator which selects a call queue of the plurality of call queues based upon the output of the dialed number identification service.

40. The apparatus as in claim 29 further comprising a measuring processor which measures a set of call parameters and determines that the call has met a call overflow criteria.

41. A method for identifying a call record of a telephone call received from a public switched telephone network (PSTN) and overflowed from a source automatic call distributor to a destination automatic call distributor, the call record having been stored under a call identifier of the source automatic call distributor in a memory of a host computer serving both the source automatic call distributor and the destination automatic call distributor, such method comprising the steps of:

creating a call record including the call identifier in an area of the memory reserved for the source automatic call distributor;

determining that the call has met an overflow criteria for overflowing the call from the source automatic call distributor to the destination automatic call distributor;

transferring a call action provided message including an identifier of the source automatic call distributor and source identifier;

transferring an overflow request including the source call identifier to the destination automatic call distributor through an integrated services digital network (ISDN) facility to the destination automatic call distributor;

transferring a call identification request from the destination automatic call distributor including the source call identifier to the host computer;

matching the source call identifier of the call identification request with the source call identifier of the call action provided message;

retrieving the identifier of the source automatic call distributor from the call action provided message; and locating the call record in the memory of the host computer based upon the identifier of the source automatic call distributor.

42. A method of identifying a call record of a telephone call received from a public switched telephone network (PSTN) and overflowed from a source automatic call distributor to a destination automatic call distributor, the call record having been stored under a position identifier of the source automatic call distributor in a memory of a host computer serving both the source automatic call distributor and the destination automatic call distributor, such method comprising the steps of:

storing a call action provided message in a call overflow table of the host computer including a previous position identifier assigned by the source automatic call distributor and an identifier of the source automatic call distributor;

transferring an overflow request over an integrated services digital network (ISDN) facility to the destination automatic call distributor including the previous position identifier;

searching the overflow table using the previous position identifier transferred to the destination automatic call distributor to locate the identifier of the source automatic call distributor; and locating the call record using the previous position identifier and located identifier of the source automatic call distributor.

43. Apparatus for identifying a call record of a telephone call received from a public switched telephone network (PSTN) and overflowed from a source automatic call distributor to a destination automatic call distributor, the call record having been stored under a position identifier of the source automatic call distributor in a memory of a host computer serving both the source automatic call distributor and the destination automatic call distributor, such apparatus comprising:

means for storing a call action provided message in a call overflow table of the host computer including a previous position identifier assigned by the source automatic call distributor and an identifier of the source automatic call distributor;

means for transferring an overflow request over an integrated services digital network (ISDN) facility to the destination automatic call distributor including the previous position identifier;

means for searching the overflow table using the previous position identifier transferred to the destination automatic call distributor to locate the identifier of the source automatic call distributor; and means for locating the call record using the previous position identifier and located identifier of the source automatic call distributor.

* * * * *